United States Patent Office 3,511,864
Patented May 12, 1970

3,511,864
PROCESS FOR ASTRINGENT COMPOUNDS
Isidore Ugelow, West Babylon, and Joseph N. Slater, Jr., Bronx, N.Y., assignors, by mesne assignments, to Armour Pharmaceutical Company, Chicago, Ill., a corporation of Delaware
No Drawing. Filed Sept. 21, 1967, Ser. No. 669,406
Int. Cl. C07f 5/06
U.S. Cl. 260—448    7 Claims

ABSTRACT OF THE DISCLOSURE

Astringent aluminum compounds are obtained by contacting in water an aluminum chlorohydroxide with a hydroxyl containing organic compound such as an aliphatic alcohol having at least hydroxyl groups or an aliphatic glycol monoether, and then removing the water by the addition of an organic, water-miscible solvent.

---

This invention relates to aluminum compounds. In particular, it relates to an improved process of preparing aluminum compounds by the reaction of aluminum chloride or aluminum chlorhydroxides with hydroxylic organic compounds.

The compounds prepared by the improved process of the invention are useful astringents in antiperspirant compositions. These compounds have a high degree of solubility in ethyl alcohol as well as in other components, e.g. glycols, commonly included in such compositions, and hence can be used therein to great advantage. The properties and methods of preparation of these compounds are described in patent application Ser. No. 190,825, filed Apr. 27, 1962, now U.S. Pat. No. 3,359,169.

In accordance with the process of this earlier application the compounds were prepared by reacting aluminum chloride or aluminum chlorhydroxy compounds of the formula $Al_2Cl_{(6-x)}(OH)_x$, where $x$ is an integer from 0 to 5, with a hydroxyl containing organic compound. In preparing the astringent aluminum compounds by this process, aluminum chloride or an appropriate aluminum chlorhydroxide, prepared, for example, as described in Australian Pat. No. 150,410, and the appropriate hydroxyl containing organic compound were contacted, in the desired molar proportions, in the presence of an amount of water sufficient to dissolve the reactants. The molar proportions ranged from about 6:1 to about 1:6, preferably from about 5:1 to about 1:5, of aluminum chloride or chlorohydroxide to the hydroxyl containing organic compound. The astringent aluminum compounds were obtained on the removal of the water from the solution by evaporation, preferably under reduced pressure, at temperatures up to about 80° C. The product obtained upon evaporation is somewhat off-white in color and of variable particle size.

In addition to the somewhat undesirable properties possessed by the product obtained upon evaporation, the evaporation step itself is quite time-consuming, even when carried out at higher temperatures and under reduced pressure. Furthermore, it is difficult to remove the last traces of water from the product, particularly when a large quantity of the product is prepared.

It is an object of this invention to provide a process to obtain from an aqueous solution of aluminum chloride or an aluminum chlorhydroxide and a hydroxyl containing organic compound a product which is white and has a substantially uniform particle size, which particle size is preferably smaller than that of the product obtained upon evaporation of the water in accordance with the process of the prior invention.

It is a further object to provide a process that will eliminate the rather long time consumed in the removal of the water from the reaction mixture by evaporation.

In accordance with this invention we provide a process for removing water from an aqueous solution of a mixture of an aluminum chlorhydroxide of the formula $Al_2Cl_{(6-x)}(OH)_x$, where $x$ is an integer from 0 to 5, and a hydroxyl containing organic compound to obtain an astringent aluminum compound, which comprises adding an organic, water-miscible solvent to an aqueous solution comprising the aluminum chlorhydroxide and the hydroxyl containing organic compound. The organic water-miscible solvent absorbs the water, thereby causing the reaction between the aluminum chlorhydroxide and the hydroxyl containing organic compound to go to completion and at the same time precipitating the astringent aluminum compound.

The organic, water-miscible solvent is free of hydroxyl groups. Such solvents which have been particularly useful include acetone, ethyl methyl ketone, propionaldehyde, dioxane, acetonitrile, propionitrile, tetrahydrofuran, and the like.

In carrying out the improved process of the invention the aluminum chlorhydroxide and the hydroxyl containing organic compound are mixed in molar ratios from about 6:1 to 1:6, preferably from about 5:1 to about 1:5, of the aluminum chlorhydroxide to the hydroxyl containing organic compound in an aqueous solution having sufficient water to dissolve both the aluminum compound and the hydroxyl containing organic compound. Desirably, concentrated aqueous solutions of the reactants are mixed. To the resulting aqueous solution is added with mixing at least 1 volume of the organic, water-miscible solvent. Preferably, about 5 to 15 volumes of said solvent are used. The astringent aluminum compound precipitates and can be readily obtained by decantation of the supernatant liquid or by filtration.

The hydroxyl containing organic compounds for use in the preparation of the astringent aluminum compound include organic compounds having at least two hydroxyl groups and ethers having at least one hydroxyl group. Suitable hydroxyl containing compounds are glycols such as ethylene glycol, propylene glycol, 1,4-butanediol, 1,4-butene-diol, and the like, aliphatic ether glycols having one or more ether linkages in the chain such as polyoxyalkylene glycols, preferably those having a molecular weight of about 200, monohydroxy glycol monoethers, and polyhydroxy compounds such as glycerol, 1,2,6-hexanetriol, 1,2,4-butanetriol, trimethylolpropane and the like.

The invention will be more fully understood from the examples which follow, and it is intended to cover all changes and modifications of the examples of the invention herein chosen for purposes of disclosure which do not depart from the spirit and scope of the invention.

EXAMPLE 1

To about 4 ml. of an aqueous solution containing 1.21 g. $Al_2Cl(OH)_5$ and 1.58 g. propylene glycol was added 40 ml. acetone. The resulting mixture was stirred for a few minutes and after the precipitate settled the supernatant liquid was decanted. The residue was stirred with an additional 24 ml. acetone and then separated by filtration and dried. The starting mol ratio of propylene glycol:aluminum chlorhydroxide was of about 3:1.

EXAMPLE 2

The procedure of Example 1 was repeated using acetonitrile in place of acetone.

EXAMPLE 3

To 4 ml. of an aqueous solution of 0.87 g. $Al_2Cl(OH)_5$ and 2.26 g. propylene glycol was added 40 ml. dioxane. The procedure of Example 1 was followed. The starting mol ratio of propylene glycol:aluminum chlorhydroxide was about 6:1.

EXAMPLE 4

The procedure of Example 3 was repeated using methyl ethyl ketone in place of dioxane.

EXAMPLE 5

To 15 ml. of an aqueous solution containing 9.6 g. $Al_2Cl_2(OH)_4$ and 1.55 g. ethylene glycol was added 120 ml. tetrahydrofuran. The procedure of Example 1 was then followed. The starting mol ratio of ethylene glycol: aluminum chlorhydroxide was about 1:2.

EXAMPLE 6

The procedure of Example 3 was repeated using glycerin in place of propylene glycol and a starting mol ratio of glycerine:aluminum chlorhydroxide of about 6:1.

EXAMPLE 7

The procedure of Example 1 was repeated using trimethylolpropane in place of propylene glycol and the same molar ratio of starting materials.

Similar results were obtained using other aluminum chlorhydroxides of the general formula and other aliphatic compounds having at least 2 hydroxyl groups and aliphatic glycolmonoethers.

The compounds obtained by the improved process of the invention can be compounded into antiperspirant compositions as described in the prior application.

We claim:

1. A process of preparing an alcohol-soluble, glycol-soluble aluminum astringent product which comprises contacting an aluminum compound of the formula $$Al_2Cl_{(6-x)}(OH)_x$$

where $x$ is an integer from 0 to 5, with an hydroxyl containing organic compound selected from the group consisting of aliphatic alcohols having at least 2 hydroxyl groups and aliphatic glycol monoethers, in the presence of sufficient water to dissolve the reactants and then removing the water from the system by adding thereto an organic, water-miscible solvent free of hydroxyl groups.

2. A process according to claim 1, wherein the organic, water-miscible solvent free of hydroxyl groups is selected from the group consisting of acetone, ethyl methyl ketone, acetonitrile, dioxane, and tetrahydrofuran.

3. A process according to claim 2, wherein the aluminum compound is the formula $Al_2Cl(OH)_5$.

4. A process according to claim 1, wherein the mol ratio of aluminum compound to the hydroxyl containing organic compound is between about 6:1 to 1:6.

5. A process according to claim 3, wherein the hydroxyl containing organic compound is propylene glycol.

6. A process according to claim 3, wherein the hydroxyl containing organic compound is glycerine.

7. A process according to claim 3, wherein the hydroxyl containing organic compound is trimethylolpropane.

References Cited

UNITED STATES PATENTS 2,890,987   6/1959   Hilfer.
3,359,169   12/1967   Slater et al.

TOBIAS E. LEVOW, Primary Examiner

H. M. SNEED, Assistant Examiner